(12) United States Patent
Nong et al.

(10) Patent No.: US 7,788,131 B2
(45) Date of Patent: Aug. 31, 2010

(54) ADVERTISING KEYWORD CROSS-SELLING

(75) Inventors: Shuzhen Nong, Bellevue, WA (US); Ying Li, Bellevue, WA (US); Tarek Najm, Kirkland, WA (US); Li Li, Issaquah, WA (US); Hua-Jun Zeng, Haidian District (CN); Zheng Chen, Haidian District (CN); Benyu Zhang, Haidian District (CN)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 11/300,918

(22) Filed: Dec. 15, 2005

(65) Prior Publication Data

US 2007/0143176 A1 Jun. 21, 2007

(51) Int. Cl.
*G06Q 30/00* (2006.01)
(52) U.S. Cl. .................................. 705/14.49; 705/14.71
(58) Field of Classification Search ................... 705/14, 705/10, 14.49, 14.71
See application file for complete search history.

(56) References Cited

U.S. PATENT DOCUMENTS

| | | | | |
|---|---|---|---|---|
| 5,615,341 | A * | 3/1997 | Agrawal et al. ............... | 705/10 |
| 5,649,114 | A * | 7/1997 | Deaton et al. ................. | 705/14 |
| 5,812,997 | A * | 9/1998 | Morimoto et al. .............. | 707/2 |
| 6,199,034 | B1 * | 3/2001 | Wical ............................ | 704/9 |
| 6,336,132 | B2 * | 1/2002 | Appleman et al. ........... | 709/203 |
| 6,625,581 | B1 * | 9/2003 | Perkowski ................... | 705/27 |
| 6,778,970 | B2 * | 8/2004 | Au ............................... | 706/55 |
| 6,804,659 | B1 * | 10/2004 | Graham et al. ................ | 705/14 |
| 6,868,525 | B1 * | 3/2005 | Szabo ......................... | 715/738 |
| 6,876,997 | B1 * | 4/2005 | Rorex et al. .................... | 707/3 |
| 7,152,064 | B2 * | 12/2006 | Bourdoncle et al. ............ | 707/5 |
| 7,437,368 | B1 * | 10/2008 | Kolluri et al. ...................... | 1/1 |
| 7,451,099 | B2 * | 11/2008 | Henkin et al. ................. | 705/14 |
| 7,461,044 | B2 * | 12/2008 | Salahshour et al. ........... | 706/47 |
| 7,668,950 | B2 * | 2/2010 | Horowitz et al. ............ | 709/223 |

(Continued)

FOREIGN PATENT DOCUMENTS

CA 2497168 3/2004

(Continued)

OTHER PUBLICATIONS http://www.wikipedia.org search for cross-selling accessed Aug. 12, 2008.*

(Continued)

*Primary Examiner*—James W Myhre
*Assistant Examiner*—Adam Chornesky
(74) *Attorney, Agent, or Firm*—Shook, Hardy & Bacon LLP

(57) ABSTRACT

Seed keywords are leveraged to provide expanded keywords that are then associated with relevant advertisers. Instances can also include locating potential advertisers based on the expanded keywords. Inverse lookup techniques are employed to determine which keywords are associated with an advertiser. Filtering can then be employed to eliminate inappropriate keywords for that advertiser. The keywords are then automatically revealed to the advertiser for consideration as relevant search terms for their advertisements. In this manner, revenue for a search engine and/or for an advertiser can be substantially enhanced through the automatic expansion of relevant search terms. Advertisers also benefit by having larger and more relevant search term selections automatically available to them, saving them both time and money.

18 Claims, 13 Drawing Sheets

U.S. PATENT DOCUMENTS

| | | | |
|---|---|---|---|
| 2002/0004735 A1* | 1/2002 | Gross | 705/10 |
| 2002/0010679 A1* | 1/2002 | Felsher | 705/51 |
| 2002/0040315 A1 | 4/2002 | Kindo et al. | |
| 2002/0069105 A1* | 6/2002 | do Rosario Botelho et al. | 705/14 |
| 2003/0050929 A1 | 3/2003 | Bookman et al. | |
| 2003/0055816 A1* | 3/2003 | Paine et al. | 707/3 |
| 2003/0078913 A1* | 4/2003 | McGreevy | 707/3 |
| 2004/0059708 A1 | 3/2004 | Dean et al. | |
| 2004/0064447 A1* | 4/2004 | Simske et al. | 707/5 |
| 2004/0078265 A1* | 4/2004 | Subramanian et al. | 705/14 |
| 2004/0122735 A1* | 6/2004 | Meshkin | 705/14 |
| 2004/0236725 A1* | 11/2004 | Amitay et al. | 707/3 |
| 2004/0267725 A1 | 12/2004 | Harik | |
| 2005/0004837 A1* | 1/2005 | Sweeney et al. | 705/14 |
| 2005/0021440 A1* | 1/2005 | Dresden | 705/37 |
| 2005/0071325 A1 | 3/2005 | Bem | |
| 2005/0080775 A1 | 4/2005 | Colledge et al. | |
| 2005/0097204 A1* | 5/2005 | Horowitz et al. | 709/223 |
| 2005/0120023 A1 | 6/2005 | Wesinger et al. | |
| 2005/0137939 A1 | 6/2005 | Calabria et al. | |
| 2005/0234972 A1 | 10/2005 | Zeng et al. | |
| 2005/0267803 A1* | 12/2005 | Patel et al. | 705/14 |
| 2005/0267809 A1* | 12/2005 | Zheng | 705/14 |
| 2006/0085405 A1* | 4/2006 | Hsu et al. | 707/3 |
| 2006/0106866 A1* | 5/2006 | Green et al. | 707/104.1 |
| 2007/0027773 A1* | 2/2007 | Lee | 705/14 |
| 2007/0143176 A1* | 6/2007 | Nong et al. | 705/14 |

FOREIGN PATENT DOCUMENTS

| | | |
|---|---|---|
| EP | 1061465 | 12/2000 |
| KR | 1020030076545 A | 9/2003 |
| KR | 1020040059115 A | 7/2004 |
| KR | 1020040092377 A | 11/2004 |
| KR | 1020050058172 A | 6/2005 |
| WO | WO 2004 055618 | 7/2004 |
| WO | WO 2004 095335 | 11/2004 |
| WO | WO 2005 065401 | 7/2005 |

OTHER PUBLICATIONS

International Search Report dated Mar. 30, 2007 mailed Mar. 30, 2007 for PCT Application Serial No. PCT/US2006/043901, 3 Pages.

Internet Retailer; It's site search, it's merchandising—it's two functions in one http://www.internetretailer.com/dailyNews.asp?id=9302, May 15, 2003.

Mamma Media Solutions http://www.mammamediasolutions.com/corporate/ir/interviews/2004-03-08CEOcast.pdf, Mar. 8, 2004.

Google AdSense; What's AdSense? http://www.google.com/services/adsense_tour/, Jan. 17, 2006.

Sponsored Search http://searchmarketing.yahoo.com/srch/index.php, Jan. 17, 2006.

* cited by examiner

ADVERTISING KEYWORD CROSS-SELLING

BACKGROUND

The Internet provides users with a mechanism for obtaining information on just about any subject matter. For example, various web sites are dedicated to posting text, images, and video relating to world, national, and local news. A user with knowledge of a uniform resource locator (URL) associated with one of such web sites can simply enter the URL into a web browser to be provided with the web site and access content. However, this is often very cumbersome. Another easier manner of locating desired information from the Internet is through utilization of a search engine. For instance, a user can enter a word or series of words into a search field and initiate a search (e.g., through depression of a button, one or more keystrokes, voice command, etc.). The search engine then utilizes search algorithms to locate web sites related to the word or series of words entered by the user into the search field, and the user can then select one of the web sites returned by the search engine to review related content.

Search engines typically generate revenue, not by supplying search capabilities, but through online advertising revenue. Advertisers traditionally utilized billboards, television, radio, and print media such as newspapers and magazines. However, with the advent of the Internet, advertisers have found a new and perhaps less expensive medium for reaching vast numbers of potential customers across a large and diverse geographic span. Search engines can provide advertisements associated with search terms that enable them to be displayed with search results, web pages, or web sites as well as in pop-up windows when a particular site is visited.

Oftentimes, users who are searching for information will see related advertisements and click on such advertisements to purchase products, thereby creating business for that particular retailer. Thus, search engines enhance an advertiser's revenue by selling advertisements to a retailer when a relevant word is utilized as a search term. Thus, an individual who enters the term "flower" into a search engine may be interested in purchasing items related to flowers—thus, it is beneficial for a company that sells floral arrangements and accessories to advertise to that user at the point in time that the user is searching for the relevant term.

Typically, advertising space relating to search terms provided to a search engine is bought or sold in an auction manner. More specifically, a search engine can receive a query (from a user) that includes one or more search terms that are of interest to a plurality of buyers. The buyers can place bids with respect to at least one of the search terms, and a buyer that corresponds to the highest bid will have their advertisement displayed upon a resulting page view. Bidding and selection of a bid can occur within a matter of milliseconds, thereby not adversely affecting usability of the search engine. Auctioning advertising space associated with search terms is a substantial source of revenue for search engines and can also be a source of revenue for advertisers.

Because of the potential of a significant boost in revenue from advertising with related search terms, businesses like to associate as many search terms and variations as possible with their advertisements. The intent of the advertiser is to select all terms and variations that would likely be used by users during a search. However, these lists of terms are often manually composed and frequently omit terms/variations that might increase sales for the advertiser. An advertiser might not also be the best source of determining these related terms. They typically do not have access to search information and must rely on logical assumptions as to what terms may be related to their businesses.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to search engines, and more particularly to systems and methods for automatically determining advertiser related search keywords and/or cross-selling search keywords to advertisers. Seed keywords are leveraged to provide expanded keywords that are then associated with advertisers. Instances can also include locating potential advertisers based on the expanded keywords. Inverse lookup techniques are then employed to determine which keywords are associated with an advertiser. Filtering can then be employed to eliminate inappropriate keywords for that advertiser. The keywords are then automatically revealed to the advertiser for consideration as relevant search terms for their advertisements. In this manner, revenue for a search engine and/or for an advertiser can be substantially enhanced through the automatic expansion of relevant search terms. Advertisers also benefit by having larger and more relevant search term selections automatically available to them, saving them both time and money.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
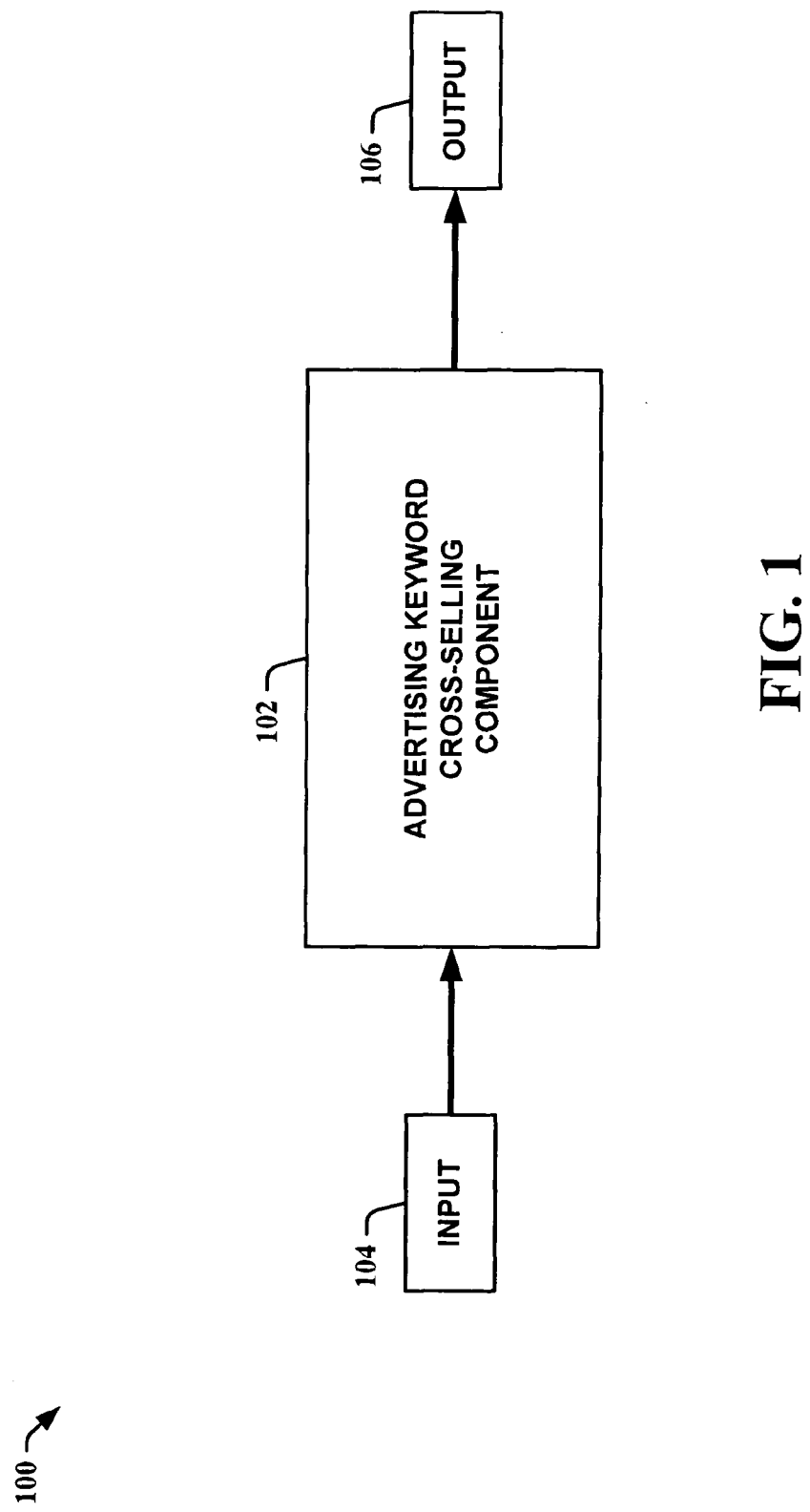
FIG. 1 is a block diagram of an advertising keyword cross-selling system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Hundreds of millions of keywords are searched every month in major search engines. However, only a small portion of the keywords are purchased as advertising links because many advertisers usually only think of those keywords that are directly related to their products or services. They often lack the insight to identify indirect, but strongly relevant keywords. An instance of the systems and methods herein provides a keyword cross-sell system (KCS) that automatically selects commercially valuable keywords from search keywords, automatically looks for potential advertisers who might be interested in purchasing them, and then actively suggests those keywords to those advertisers. Other instances include a keyword cross-sell process that provides keyword cross-sell pairs of advertisers and keywords. Another instance provides a keyword search funnel process that facilitates in determining relevant keywords.

In FIG. 1, a block diagram of an advertising keyword cross-selling system 100 in accordance with an aspect of an embodiment is shown. The advertising keyword cross-selling system 100 is comprised of an advertising keyword cross-selling component 102 that receives an input 104 and provides an output 106. The input 104 typically contains search keyword information and the like. It 104 can include keywords and also keyword metadata (e.g., number of times keyword used for searching, etc.) and the like. The source of the input 104 can be search query logs for local and/or global networks and the like and/or an advertisement data source and the like. An advertisement data source can include, but is not limited to, a source of compiled advertisement information that can contain advertisement keywords for a particular advertiser and the like.

Thus, search keywords from the input 104 can be, for example, general search terms utilized in a search engine that may or may not be associated with advertising and/or relevant search keywords that have been associated to a particular advertiser and/or advertisement and the like. The advertising keyword cross-selling component 102 can process advertising associated and/or advertising non-associated search keywords to provide the output 106. The advertising keyword cross-selling component 102 facilitates in determining keywords that can be cross-sold to advertisers. Additional keywords based on the input 104 are discovered and linked to a particular advertiser. The output 106 can be comprised of, for example, a cross-sell pair comprising a keyword and a particular advertiser (or advertisement, etc.) and the like.

In some instances, the advertising keyword cross-selling component 102 also provides interactions with advertisers themselves to actively provide discovered keywords. Thus, the output 106 can include, but is not limited to, emails, letters, and/or other forms of communication, electronic or otherwise that communicates cross-sell pairs to an advertiser. In this manner, the advertising keyword cross-selling component 102 provides cross-sell pairs and/or proactive cross-selling of the pairs. This substantially reduces the effort on the part of the advertiser to determine which keywords to associate with their advertising, substantially increasing the likelihood of increasing product/service sales while generating increased advertising revenue.

Figure 2:
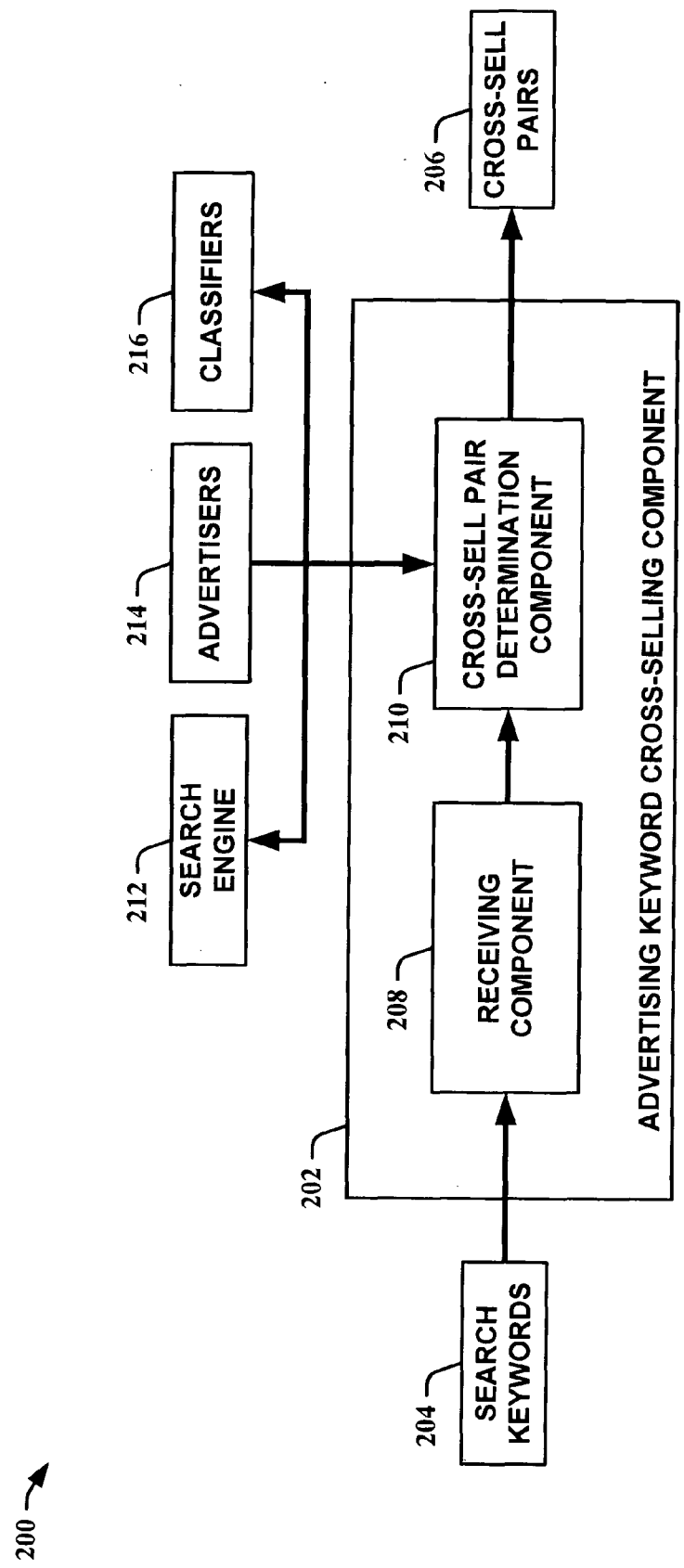
FIG. 2 is another block diagram of an advertising keyword cross-selling system in accordance with an aspect of an embodiment.

Looking at FIG. 2, another block diagram of an advertising keyword cross-selling system 200 in accordance with an aspect of an embodiment is depicted. The advertising keyword cross-selling system 200 is comprised of an advertising keyword cross-selling component 202 that receives search keywords 204 and provides cross-sell pairs 206. The advertising keyword cross-selling component 202 is comprised of a receiving component 208 and a cross-sell pair determination component 210. The receiving component 208 obtains the search keywords 204 from a keyword data source such as, for example, a search query log data source for local and/or global networks and/or an advertisement data source. An advertisement data source can include, but is not limited to, a source of compiled advertisement information that can contain advertisement keywords for a particular advertiser. The receiving component 208 can also provide pre-filtering of the search keywords 204 if necessary (e.g., removing extraneous information and the like).

The cross-sell pair determination component 210 receives the search keywords 204 from the receiving component 208 and processes the search keywords 204 to provide cross-sell pairs 206. The cross-sell pair determination component 210 can employ search engine 212 to facilitate in discovering extended keywords and the like. It 210 can also employ advertisers 214 to facilitate in constructing indexes that facilitate in cross-linking keywords to advertisers 214. Classifiers 216 can also be employed by the cross-sell pair determination component 210 to facilitate in filtering inappropriate cross-selling. These aspects are discussed in detail infra.

Figure 3:
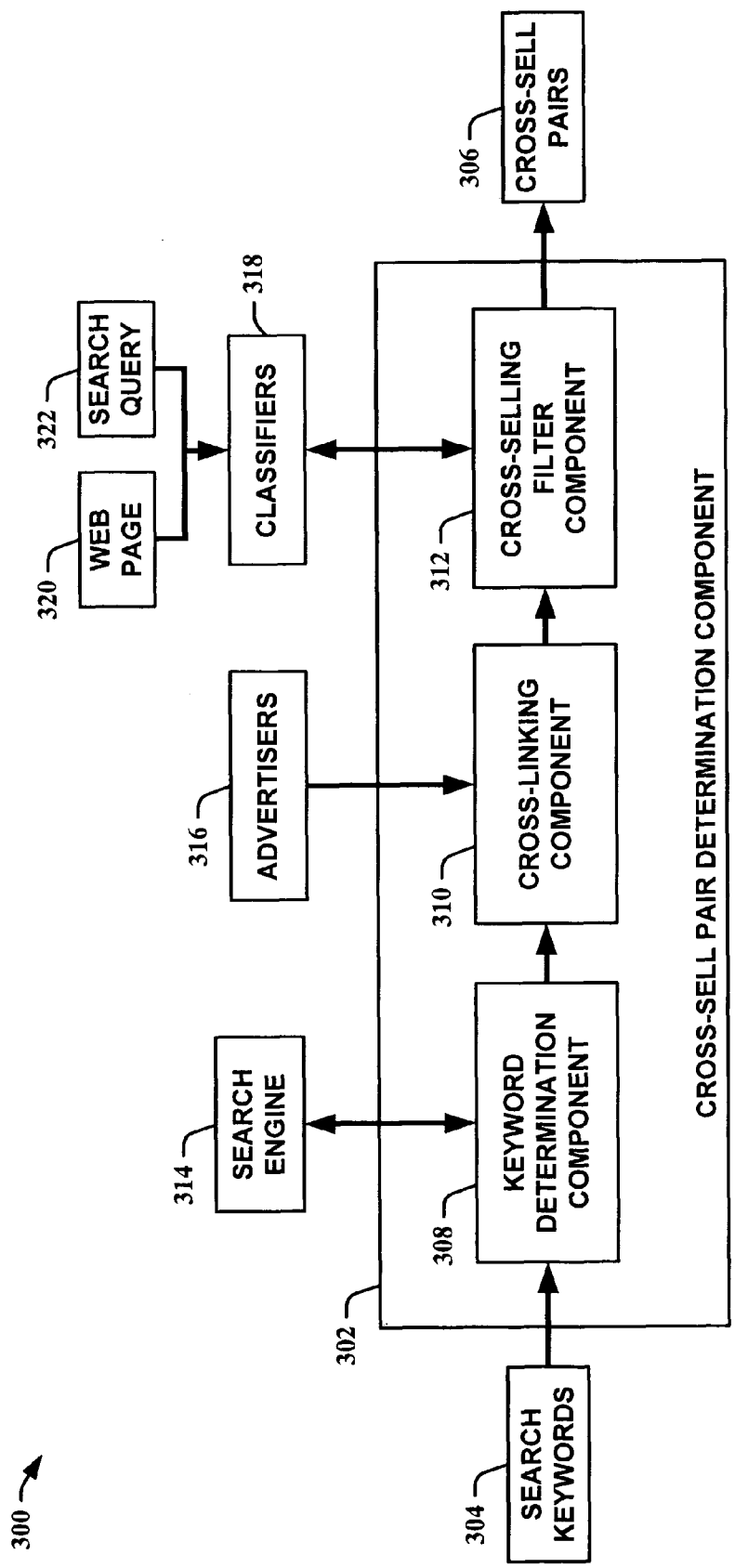
FIG. 3 is a block diagram of an advertising keyword cross-selling component in accordance with an aspect of an embodiment.

Turning to FIG. 3, a block diagram of an advertising keyword cross-selling component 300 in accordance with an aspect of an embodiment is illustrated. The advertising keyword cross-selling component 300 is comprised of a cross-sell pair determination component 302 that receives search keywords 304 and provides cross-sell pairs 306. The cross-sell pair determination component 302 is comprised of a keyword determination component 308, a cross-linking component 310, and a cross-selling filter component 312. In this instance, the keyword determination component 308 obtains the search keywords 304 directly from a keyword data source. The keyword data source can include, but is not limited to, a search query log data source for local and/or global networks and/or an advertisement data source and the like.

The keyword determination component 308 selects "seed keywords" from the search keywords 304 that meet certain criteria. For example, a keyword can become a seed keyword if it has commercial value, a frequency of use that exceeds a certain threshold for a given period, and/or a minimal amount of advertisers have previously bid on it during advertising auctions. The keyword determination component 308 then expands these seed keywords to discover other keywords that can be cross-sold. In one instance, the keyword determination component 308 employs a search funnel process to facilitate in seed keyword expansion. In another instance, the keyword determination component 308 employs a search result extraction process that employs search engine 314 to facilitate in keyword seed expansion. These processes are described in more detail infra. One skilled in the art can appreciate that other means of keyword expansion are applicable as well and fall within the scope of the systems and methods herein.

The cross-linking component 310 receives the expanded keywords from the keyword determination component 308 and links them to advertisers 316 based on relevancy to the advertiser and/or advertisement. The advertiser information can be obtained from localized advertiser lists and/or obtained by actively searching for relevant advertisers via a network such as the Internet and the like. The cross-linking component 310 provides indexing of the expanded keywords to the advertisers 316, thus, "cross-linking" them. The cross-linking component 310 can then obtain "cross-sell pair" (i.e., keyword and relevant advertiser pairs) candidates by performing inverse lookups on an index table (described in more detail infra).

The cross-selling filter component 312 obtains the cross-sell pair candidates from the cross-linking component 310 and filters the cross-sell pair candidates to provide cross-sell pairs 306. The cross-selling filter component 312 can employ classifiers 318 to facilitate in filtering the cross-sell pair candidates. Machine learning techniques can also be employed to facilitate in constructing a classifier model. For example, the classifiers 318 can utilize a web page 320 and/or a search query 322 to facilitate in determining what cross-sell pair candidates are inappropriate for a particular advertiser. For example, a tobacco producing advertiser would not want to receive cross-sell pairs that linked to search keywords about banning smoking and the like.

Figure 4:
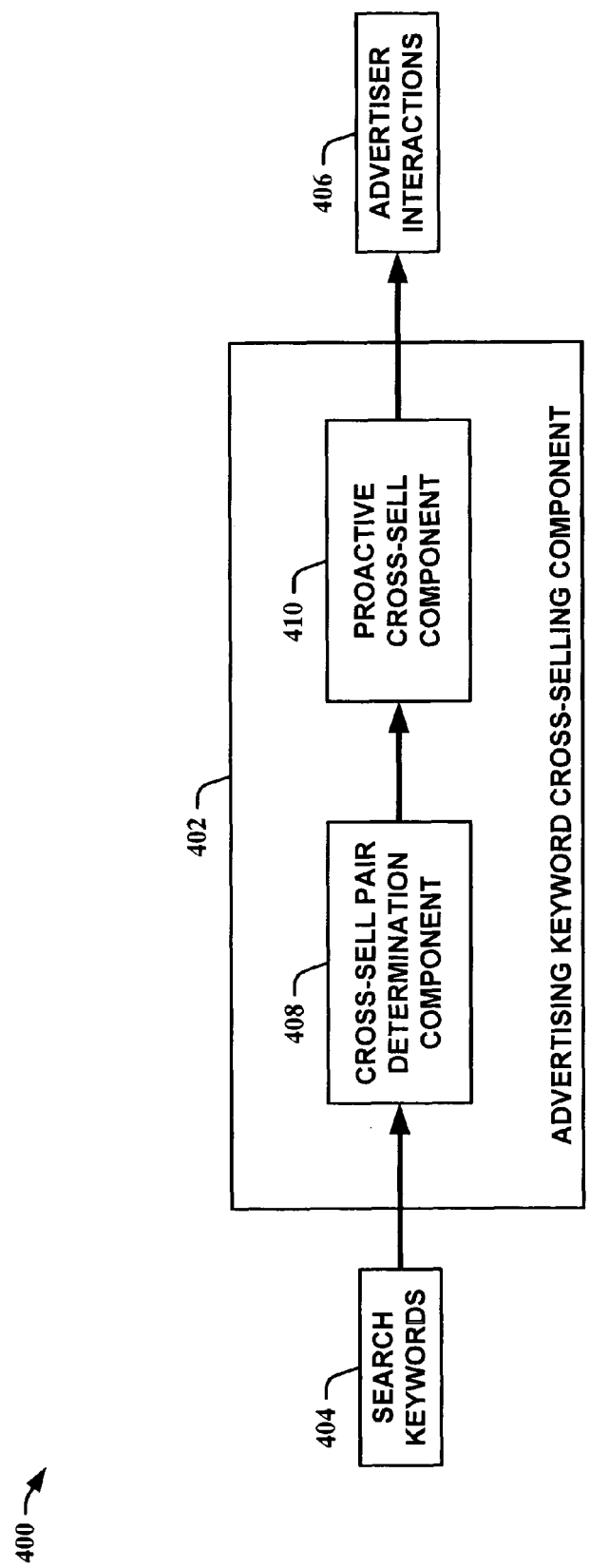
FIG. 4 is yet another block diagram of an advertising keyword cross-selling system in accordance with an aspect of an embodiment.

Moving on to FIG. 4, yet another block diagram of an advertising keyword cross-selling system 400 in accordance with an aspect of an embodiment is shown. The advertising keyword cross-selling system 400 is comprised of an advertising keyword cross-selling component 402 that receives search keywords 404 and provides advertiser interactions 406. The advertising keyword cross-selling component 402 is comprised of a cross-sell pair determination component 408 and a proactive cross-sell component 410. In this instance, the cross-sell pair determination component 408 obtains the search keywords 404 and processes them to provide cross-sell pairs to the proactive cross-sell component 410. The processing can include, for example, seed keyword generation, keyword extraction, cross-linking, and/or filtering and the like. The proactive cross-sell component 410 receives the cross-sell pairs from the cross-sell pair determination component 408 and provides advertiser interactions 406. The advertiser interactions 406 can include electronic, non-electronic, local, and/or remote interactions and the like with advertisers. The advertisers can be known customers and/or unknown customers of a given service, etc.

Thus, for example, the proactive cross-sell component 410 can construct an automatic notification email of relevant cross-sell keywords and send it to the appropriate advertiser. It 410 accomplishes this by utilizing the cross-sell pairs which contain a keyword and an advertiser. The proactive cross-sell component 410 can, for example, group all keywords relevant to a particular advertiser and notify the advertiser once and/or notifications can be sent as relevant keywords are discovered. In one instance, the proactive cross-sell component 410 provides cross-sell keywords in advertising billing statements sent to advertisers. This allows the advertisers to easily select new keywords that have a substantial likelihood of increasing their sales revenue.

This type of advertising keyword cross-selling system 400 removes a substantial burden from advertisers of having to constantly seek better keywords for their advertising. They are now automatically supplied with selections. In another instance, the proactive cross-sell component 410 can interact with advertisers to automatically receive confirmation to utilize new cross-sell keywords in an online auction system. In this manner, an advertiser can stay one step ahead of the competition by automating the reply process. This enables the advertiser to stay on top of the latest keywords for their advertisements without requiring extra effort.

Existing keyword suggestion tools attempt to achieve this goal to some extent: when advertisers enter their selected keywords, the keyword suggestion tool lists a group of related keywords to advertisers. However, it is still the advertisers' job to come up with those original keywords that are needed by the keyword suggestion tools. Thus, the scope of suggested keywords is very limited with traditional tools. In sharp contrast, a keyword cross-sell system (KCS), provided by instances of the systems and methods herein, automatically selects commercially valuable keywords from search keywords, actively looks for potential advertisers who might be interested in them, and then actively suggests those keywords to those advertisers. The process is automatic and the suggested keywords can be sent out regularly, for example, through personalized newsletters, emails, and/or other notices and the like to the advertisers. By employing a KCS, advertisers can be effectively helped to discover potential keywords that they have not conceived of before, keyword sales can be proactively pushed, and paid search revenue can be increased.

As just described, instances of the systems and methods herein can provide a process to automatically discover potential commercially valuable keywords and proactively cross-sell them to relevant advertisers. Instances can also provide a process of linking a keyword to advertisers who are most likely to be interested in the keyword. This process generally consists of the following three steps: (1) finding commercially valuable keywords to utilize as "seed keywords" and then expanding the seed keywords to search sequentially and/or conceptually related keywords which are denoted as "expanded keywords"—a search funnel process (described infra) can be employed, for example, to determine related keywords; (2) constructing keyword-to-advertiser inverse index table then using the expanded keywords as queries to retrieve relevant advertisers—a score is assigned to each <keyword, advertiser> pair and then the top N most relevant advertisers are returned, where N is an integer from one to infinity; and/or (3) filtering out inappropriate cross-selling by analyzing attitude and/or cause-effect relationships—for example, if the keyword is "stop smoking," it is not suggested to tobacco companies or if the keyword is "foot pain," it is suggested to shoe sellers, but if the keyword is "high heel," it is not suggested to foot pain healer sellers.

Figure 5:
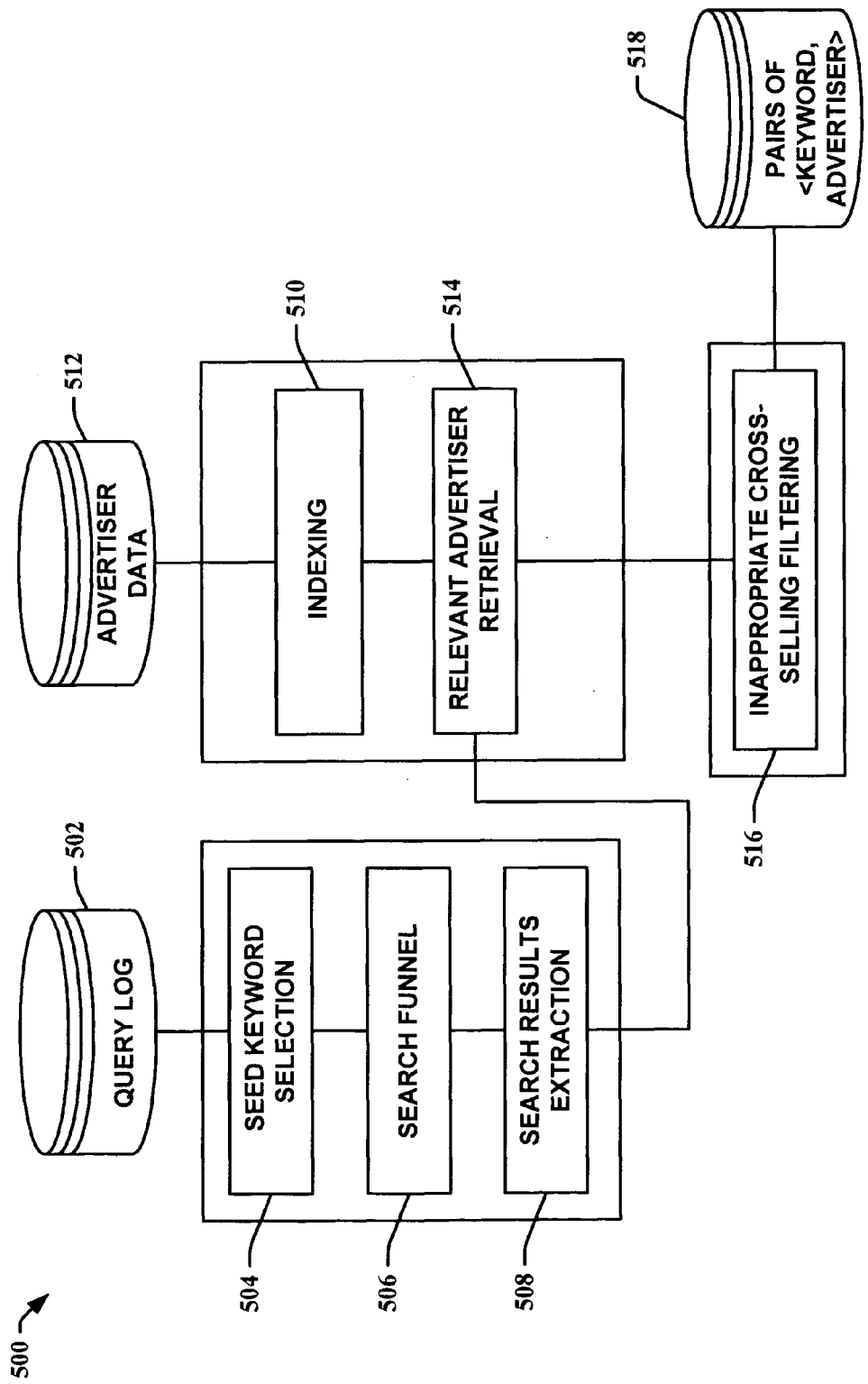
FIG. 5 is an example overview of a keyword cross-selling process in accordance with an aspect of an embodiment.

In FIG. 5, an example overview of a keyword cross-selling process 500 in accordance with an aspect of an embodiment is illustrated. The process 500 is described as follows:

Seed Keyword Selection and Expansion

In this process 500, KCS first searches through the search keywords of a query log 502, selecting potentially valuable keywords as seed keywords 504 and then expands the seed keywords by employing a search funnel 506 and search results extraction 508. These processes 504-506 can be performed as follows:

Seed Keyword Selection

Among the keywords searched by online users, not all of them can interest advertisers. Thus, KCS first automatically searches through the keywords and selects the keywords that satisfy, for example, the following criteria for seed keywords: (a) they have commercial value; (b) their frequency exceeds a certain number in a given period (e.g., one month or one day, depending on the update rate of a system, etc.) of a search query log; and/or (c) a substantially small amount of advertisers have bid on the keywords. Next, KCS utilizes a bridge concept to connect keywords to advertisers who are likely to be interested in the cross-sold keywords. The first half of the bridge is a keyword expansion process, which can include, for example, search funnel expansion and/or search snippet extraction expansion and the like.

Search Funnel

"Search funnels" facilitate in analyzing searchers' similar interest between keywords—the funnels represent searchers' transitions from one keyword to another. The funnels can be consolidated so that a push for keyword cross-sell is stronger and more substantial. For example, consider a scenario where among 1000 searchers who search for keyword A, 900 of them also search for keyword B immediately after keyword A. With so many searchers showing such a similar search pattern, it is highly likely that keyword B is very related to keyword A in representing the searchers' information interest; and, if these searchers are interested in advertisements that are shown when they search for keyword B, then they will likely also be interested in the advertisements when they search for keyword A. Thus, the transition from keyword A to keyword B constructs a search funnel that indicates a similar interest between these two keywords. Thus, it can be suggested to advertisers who originally only target on keyword B to also consider targeting on keyword A.

Figure 6:
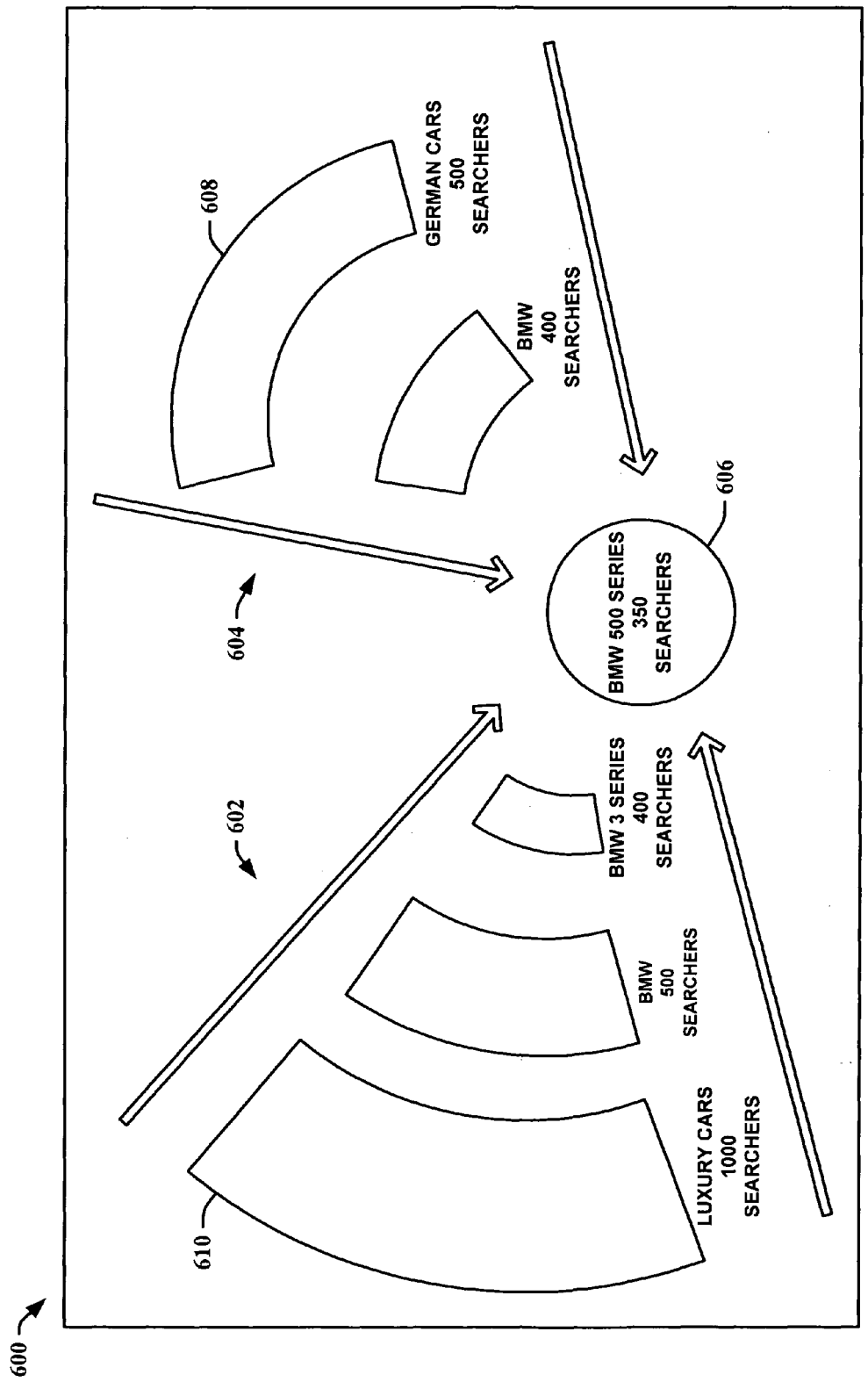
FIG. 6 is an illustration of hypothetical search funnels that lead to the same keyword in accordance with an aspect of an embodiment.

Sometimes there can be too many thin funnels or "hairy funnels" if search funnels are constructed simply by connecting query terms in a search session. In order to consolidate funnels, the following processes are utilized: (a) funnel clustering; (b) noise filtering through text mining techniques; and/or (c) keyword type categorization. In FIG. 6, an illustration 600 of hypothetical search funnels 602, 604 that lead to the same keyword 606 in accordance with an aspect of an embodiment is shown. From the search funnels 602, 604, both "German cars" 608 and "Luxury cars" 610 are two upper stream queries that finally lead to the query "BMW 500 Series" 606—that is, many searchers who search for those two keywords will finally search for "BMW 500 series" 606 at the end. The size of a funnel, i.e., the number of searchers of the keywords, shows that quite a few searchers have the same tendency and that the funnels are not rare cases. Thus, it can be suggested to advertisers who originally only target on "BMW 500 Series" 606 to consider also targeting on keywords such as "German cars," 608 and "Luxury cars" 610 and the like. Similarly, the keywords searched later than "BMW 500 Series" 606 can also represent the similar information interest—these keywords are referred to as "down stream" keywords, and the associated funnels are denoted as "outgoing" funnels.

Figure 7:
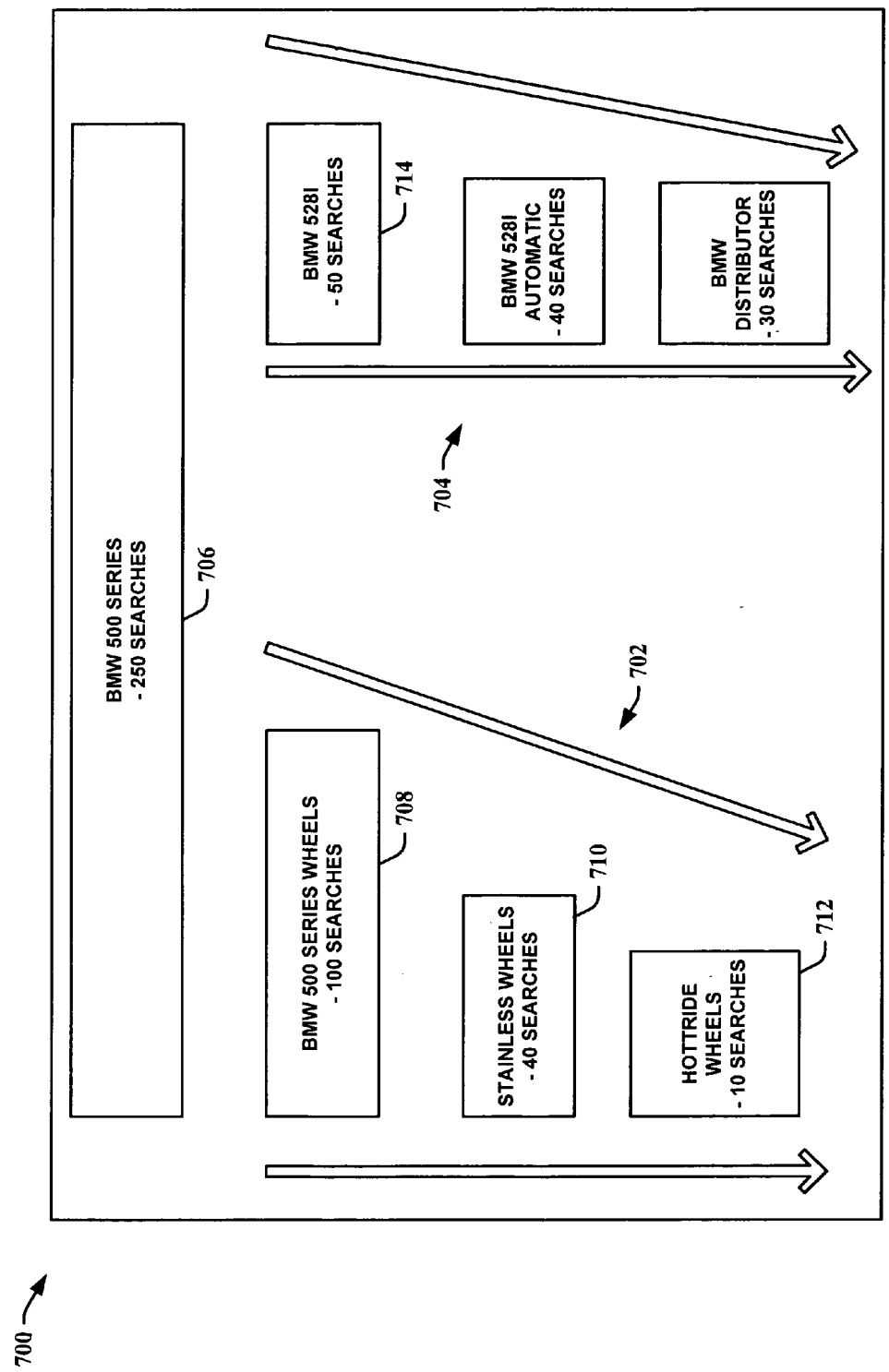
FIG. 7 is an illustration of outgoing search funnels in accordance with an aspect of an embodiment.

Turning to FIG. 7, an illustration 700 of outgoing search funnels 702, 704 in accordance with an aspect of an embodiment is depicted. Similar to FIG. 6, the advertiser who originally only targets on "BMW 500 Series" 706 should also consider targeting on "BMW 500 Series Wheels," 708 "Stainless Wheels," 710 "Hottride Wheels," 712 and/or "BMW 528i" 714 and the like. Thus, as seen from these illustrations, utilizing the visualization of search funnels can provide an intuitive and graphical demonstration of how keywords are related and give advertisers convincing suggestions of keyword cross-sells.

Typically, search funnels are constructed by employing the following process: (a) first, sessionize search page views (i.e., determine the session that the page views belong to); (b) extract search keywords from each session in order and form funnels; (c) count the number of searchers for each keyword to determine the size of the funnel; and (d) visualize the results in a graph and/or other type of illustration. However, sometimes there are too many thin funnels (hairy funnels). For example, for a keyword A, there are many funnels that can lead to it and come out of it; and, often times, each funnel only happens one or two times. These funnels contain too much randomness and cannot form convincing suggestions for advertisers' keyword cross-sell. Thus, in order to consolidate the funnels, the following process can be utilized:

(a) Funnel Clustering:
Apply a sequential clustering algorithm to cluster similar funnels into a thicker, bigger funnel. For example:
Funnel 1: A→B→D→E
Funnel 2: A→B→C→D→E
Merge Funnel 2 into Funnel 1 when Funnel 2 has significantly less traffic than Funnel 1.

(b) Noise Filtering Through Text Mining Techniques:
Use, for example, spell check (for example, flowere→flower), depluralizing (for example, flowers→flower), stemming (for example, moving→move), stop-word list (e.g., a, the, is) to filter out noise in search keywords.

(c) Keyword Type Categorization:
Categorize keywords by type. TABLE 1 contains keyword types and some examples:

TABLE 1

Keyword Type Categorization Example

| Type | Examples |
| --- | --- |
| Person names | Zheng Li, David Shecker, Laurence Parisotte |
| Location names | Washington, Columbus, Londres |
| Words with acronyms | (IM, instant messenger), (IR, information retrieval), (BI, business intelligence) |
| Words with synonyms | (gift, donation, allowance, award, bonus) |
| Words with similar meaning by users | Valentine, craft ideas |
| Words with similar meaning by context | roses, Valentine, February 14 |

TABLE 1-continued

Keyword Type Categorization Example

| Type | Examples |
|---|---|
| Words with similar intentions | (purchase, order, book, buy), (look up, check, find) |
| Words with similar etymon | flowers, wildflowers, sunflower |
| Words with specific meaning | flower delivery, flower shop, flower girl, flower show, flower pictures |
| http; ftp, email | http://msn.com |
| IP | 62.245.23.108 |
| Zip code | 44011, 65403, 93555 |
| Time, date, Money | 4 pm, Dec. 05, 2008, $32.04 |
| Telephone/Fax numbers | 404-932-3384, 210-345-9087 |

Search Result Extraction

In order to expand seed keywords to related keywords, KCS can also, for example, send the keywords to a search engine to obtain a top Z page titles and snippets back, where Z is an integer from one to infinity, and merge them to generate a high dimension feature (e.g., near 1,000 terms). This process deals with new keywords and/or synonyms which seldom occur in advertisers' web pages and/or existing advertisements and the like. By expanding this keyword using search engines, related terms for this keyword can be obtained that are better matching against the advertiser's web pages and/or advertisements and the like.

Indexing and Advertiser Retrieval

The other half of the bridge to connect a keyword to advertisers is the indexing and retrieval process as described below:

Indexing

Figure 8:
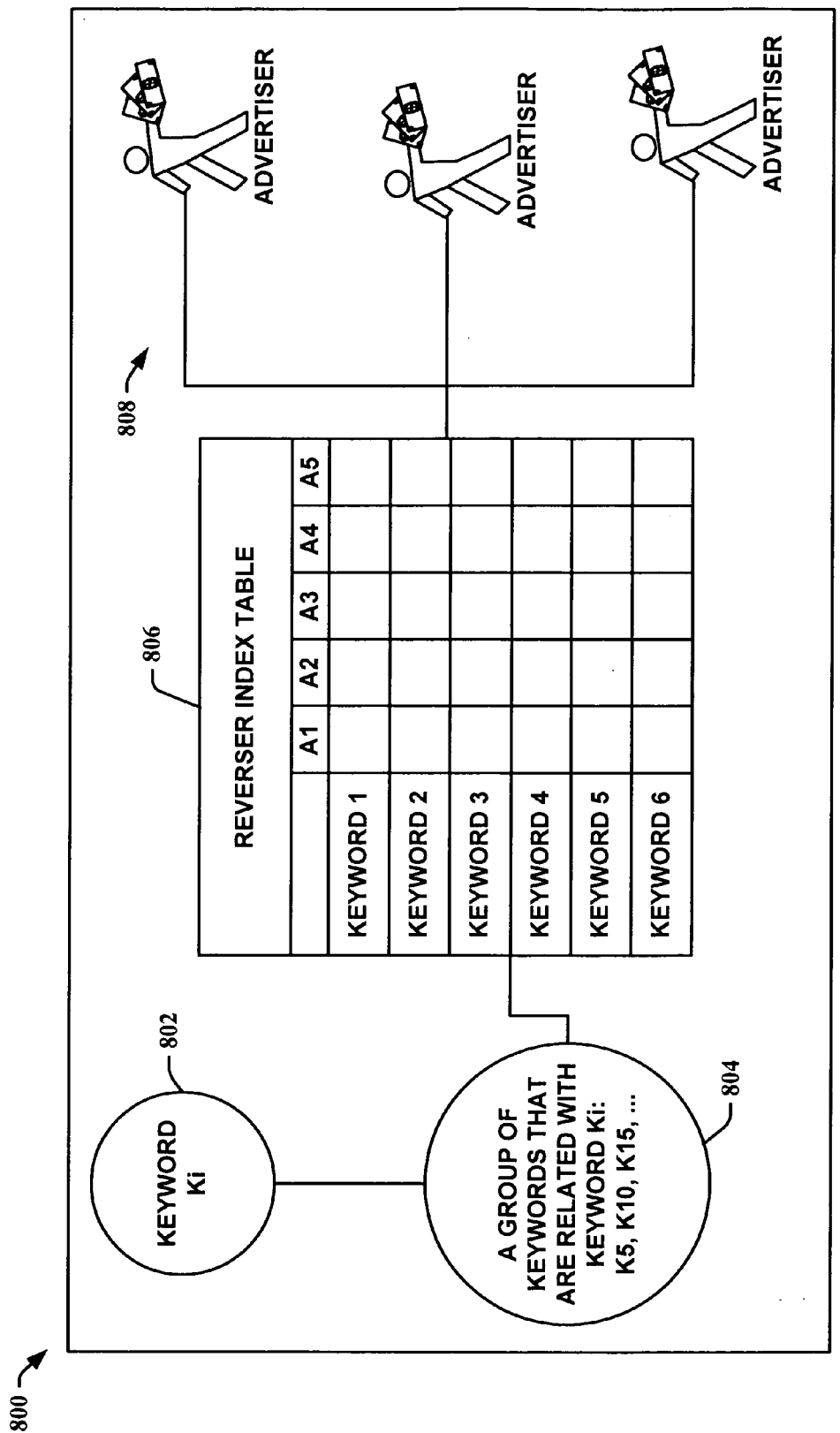
FIG. 8 is an illustration of an example role of indexing in a keyword cross-selling process in accordance with an aspect of an embodiment.

KCS can utilize indexing 510 (see FIG. 5) to build an inverted index for the text content (i.e., advertiser data 512) of each advertiser. The text content 512 includes an advertiser's web pages (e.g., page body, title, metadata, etc.), advertiser's current advertisements (e.g., title and description, etc.) and their existing keywords. FIG. 8 is an illustration 800 of an example role of indexing in a keyword cross-selling process in accordance with an aspect of an embodiment. A keyword Ki 802 is utilized as a seed to facilitate in determining a group of keywords that are related with keyword Ki 804. The group 804 is then indexed into a reverser index table 806. Advertisers 808 are then associated with the group 804 via the reverser index table 806.

Advertiser Retrieval

Expanded keywords can then be used as queries for relevant advertiser retrieval 514 (see FIG. 5) to retrieve the advertisers based on an inverted index. The resulting advertisers are then ranked by their relevance to the keyword. The parameters can also be tuned for a combination of advertiser's web pages, advertisers' current advertisements, and/or their existing keywords and the like, to get better retrieval relevance.

Inappropriate Cross-Selling Filtering

Inappropriate cross-selling filtering 516 (see FIG. 5) eliminates those advertisers who do not sell anything related to the keyword. For example, for a keyword "stop smoking," advertisers are selected based on their web content according to the above retrieval process. However, if an advertiser's content actually sells cigarettes, then "stop smoking" is not cross-sold to the advertiser. Another example is, if the keyword is "foot pain," it can be suggested to shoe sellers; but if the keyword is "high heel," it is not suggested to foot pain healer sellers.

KCS can also employ a classifier to output a sentiment of a web page (and/or a query) according to a particular topic. The classifier can be trained, for example, from human labeled sentences, so that terms like no, not, bad, stop, prevent, unhealthy, etc. can identify a negative sentiment. The classifier attempts to determine the sentiment of each sentence to topic words. And, the whole document's sentiment is the combination of all its sentences. Machine learning classifiers can be employed as well. Thus, after inappropriate cross-selling filtering 516 and/or classifying are accomplished, cross-selling pairs of <keyword, advertiser> 518 are provided.

Figure 9:
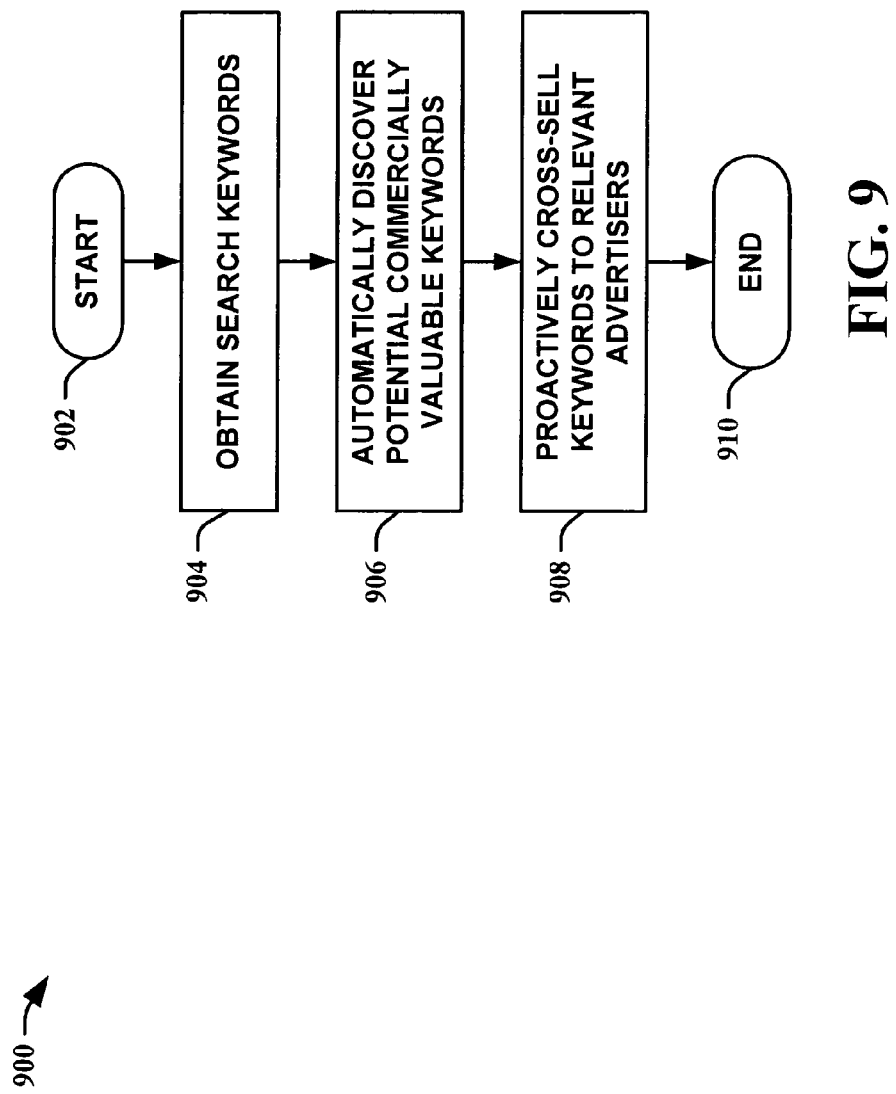
FIG. 9 is a flow diagram of a method of facilitating advertising keyword cross-selling in accordance with an aspect of an embodiment.
Figure 10:
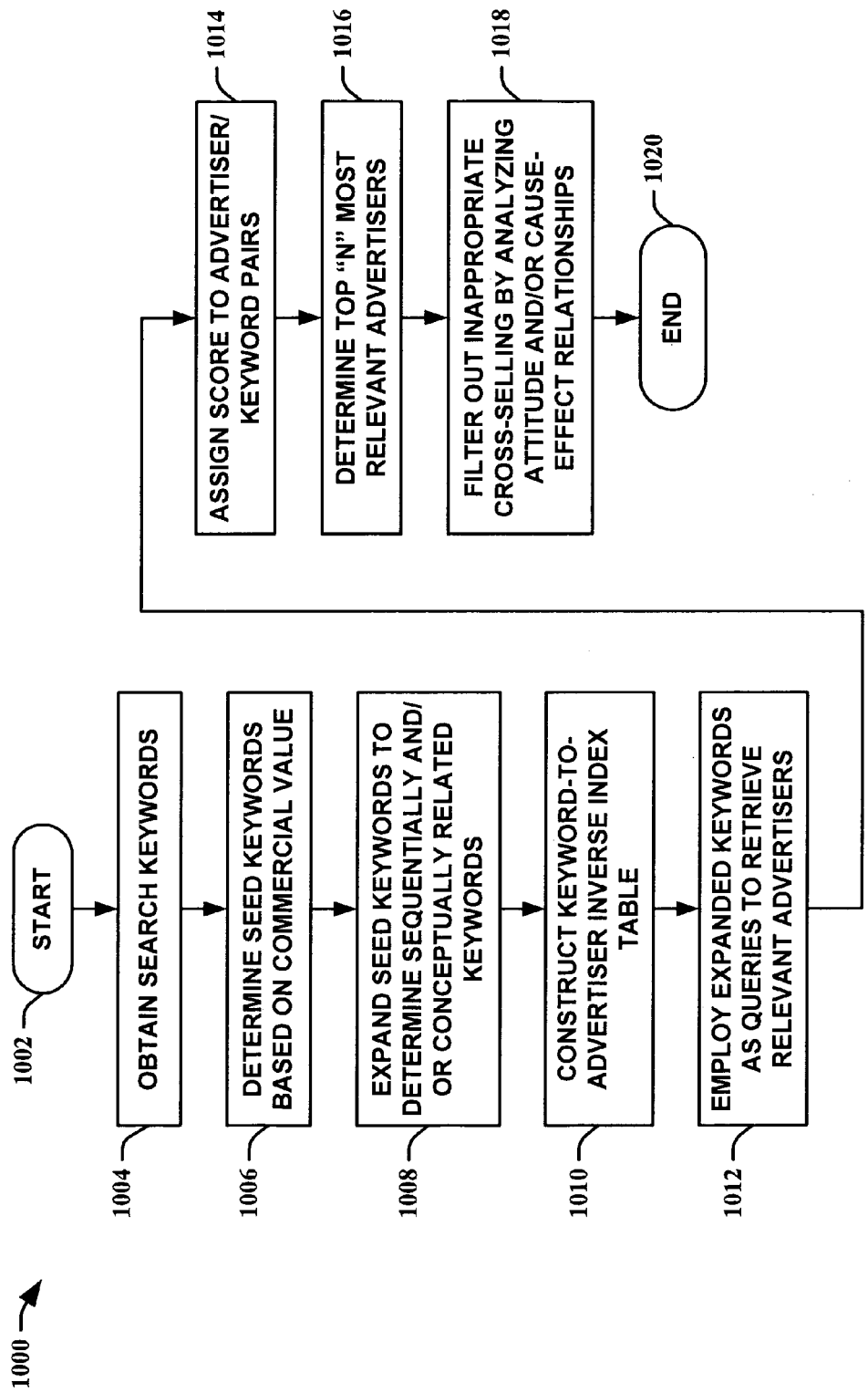
FIG. 10 is another flow diagram of a method of facilitating advertising keyword cross-selling in accordance with an aspect of an embodiment.
Figure 11:
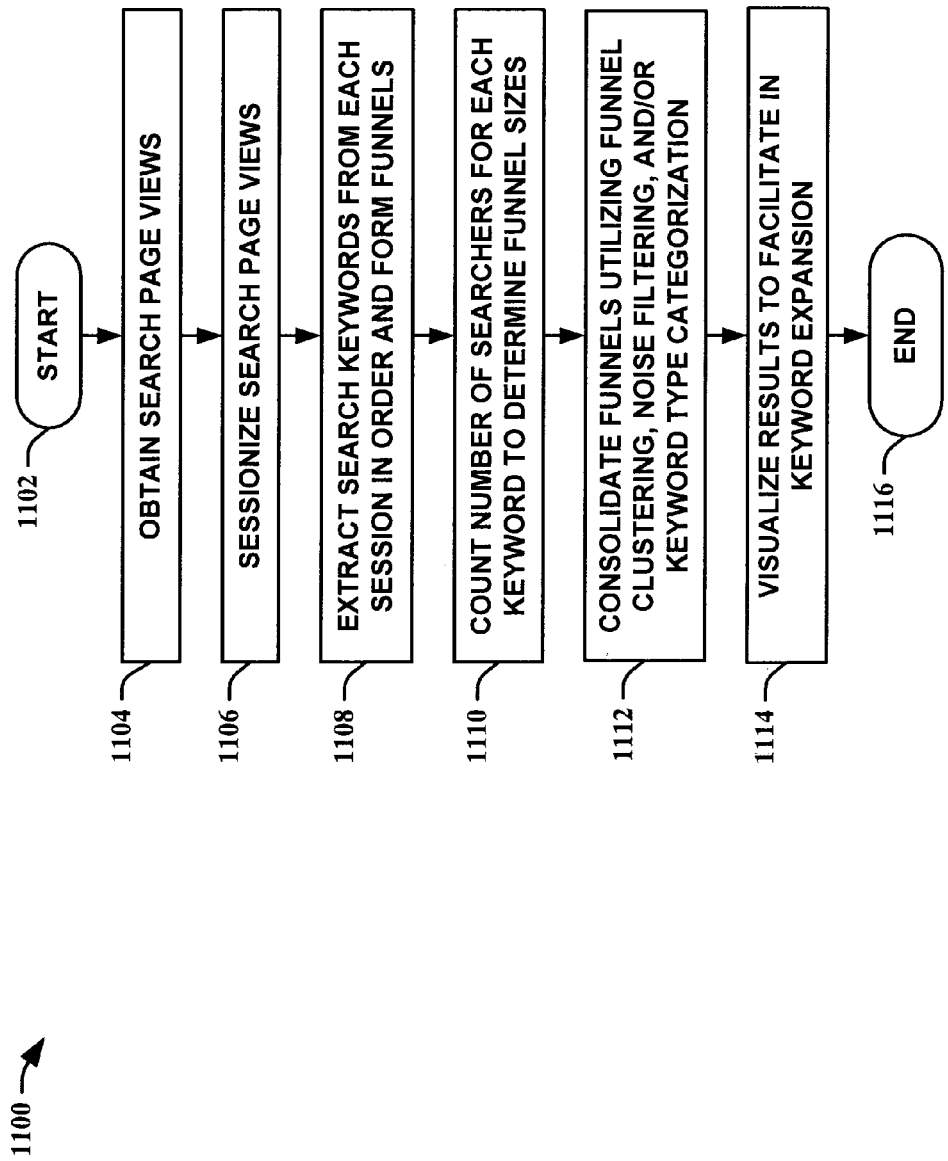
FIG. 11 is a flow diagram of a method of constructing search funnels to facilitate advertising keyword cross-selling in accordance with an aspect of an embodiment.

In view of the exemplary systems shown and described above, methodologies that may be implemented in accordance with the embodiments will be better appreciated with reference to the flow charts of FIGS. 9-11. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 9, a flow diagram of a method 900 of facilitating advertising keyword cross-selling in accordance with an aspect of an embodiment is shown. The method 900 starts 902 by obtaining search keywords 904. The search keywords can be, for example, general search terms utilized in a search engine that may or may not be associated with advertising and/or relevant search keywords that have been associated to a particular advertiser and/or advertisement and the like. The search keywords (and related information) can be obtained, for example, from search query logs for local and/or global networks and the like and/or an advertisement data source and the like. An advertisement data source can include, but is not limited to, a source of compiled advertisement information that can contain advertisement keywords for a particular advertiser and the like (this type of source typically provides better quality seed keywords for a particular advertiser).

Potential commercially valuable keywords are then automatically discovered 906. This can be accomplished for example, by expanding on seed keywords utilizing search engine result techniques and/or search funnels and the like. Keywords are proactively cross-sold to relevant advertisers 908, ending the flow 910. The proactive selling means can include electronic, non-electronic, local, and/or remote interactions and the like. The relevant advertisers can be known customers and/or unknown customers of a given service, etc. For example, relevant cross-sell keywords can be sent to an advertiser via an automatic email notification and/or provided in advertising billing statements and the like. This allows advertisers to easily select new keywords that have a substantial likelihood of increasing their sales revenue.

Referring to FIG. 10, another flow diagram of a method 1000 of facilitating advertising keyword cross-selling in accordance with an aspect of an embodiment is depicted. The method 1000 starts 1002 by obtaining search keywords 1004. The search keywords can be, for example, general search terms utilized in a search engine that may or may not be associated with advertising and/or relevant search keywords that have been associated to a particular advertiser and/or advertisement and the like. The search keywords (and related information) can be obtained, for example, from search query logs for local and/or global networks and the like and/or an advertisement data source and the like. An advertisement data source can include, but is not limited to, a source of compiled advertisement information that can contain advertisement keywords for a particular advertiser and the like (this type of source typically provides better quality seed keywords for a particular advertiser).

Seed keywords are then determined based on the commercial value 1006. Other factors can be utilized as well. For example, frequency of use of a keyword and/or whether or not a keyword has been bid on by prospective advertisers in prior advertising auctions and the like. Seed keywords are then expanded to determine sequentially and/or conceptually related keywords 1008. This can be accomplished by utilizing search funnel techniques and/or search engine result extraction techniques and the like. A keyword-to-advertiser inverse index table is constructed 1010. The index table, for example, can be constructed with the text content of each advertiser such as, for example, web pages, advertiser's current advertisements, and/or existing advertiser keywords and the like. Expanded keywords are then employed as queries to retrieve relevant advertisers 1012. A score is assigned to advertiser/keyword pairs 1014.

The top "N" most relevant advertisers are then determined 1016, where "N" is an integer from one to infinity. Inappropriate cross-selling is filtered out by analyzing attitude and/or cause-effect relationships 1018, ending the flow 1020. Classifiers can be employed to facilitate the filtering process. For example, a classifier can learn the sentiment of a web page and/or query according to a particular topic. The classifier can be trained from, for example, human labeling and the like. Negative sentiments can then be incorporated to facilitate in determining appropriateness.

Turning to FIG. 11, a flow diagram of a method 1100 of constructing search funnels to facilitate advertising keyword cross-selling in accordance with an aspect of an embodiment is illustrated. The method 1100 starts 1102 by obtaining search page views 1104. The search page views can be obtained from local and/or remote sources such as, for example, an intranet and/or Internet source and the like. Search page views are then sessionized 1106 (i.e., the session that the page views belong to is determined). Search keywords are then extracted from each session in order and funnels are formed 1108. The number of searchers for each keyword is counted to determine the funnel sizes 1110. Funnels are consolidated utilizing funnel clustering, noise filtering, and/or keyword type categorization 1112. Consolidating the search funnels is optional in some instances. The results are visualized to facilitate in keyword expansion 1114, ending the flow 1116. FIGS. 6 and 7 provide examples of visualizing search funnels to facilitate in illustrating relationships of search keywords. Actual visualization is not necessarily required in all instances. For example, search funnel parameters can be employed in a system without the system "visually" inspecting the search funnel for keyword relational information. One skilled in the art can appreciate that search funnel techniques can be employed in other settings and are not limited in application to only keyword cross-selling.

Figure 12:
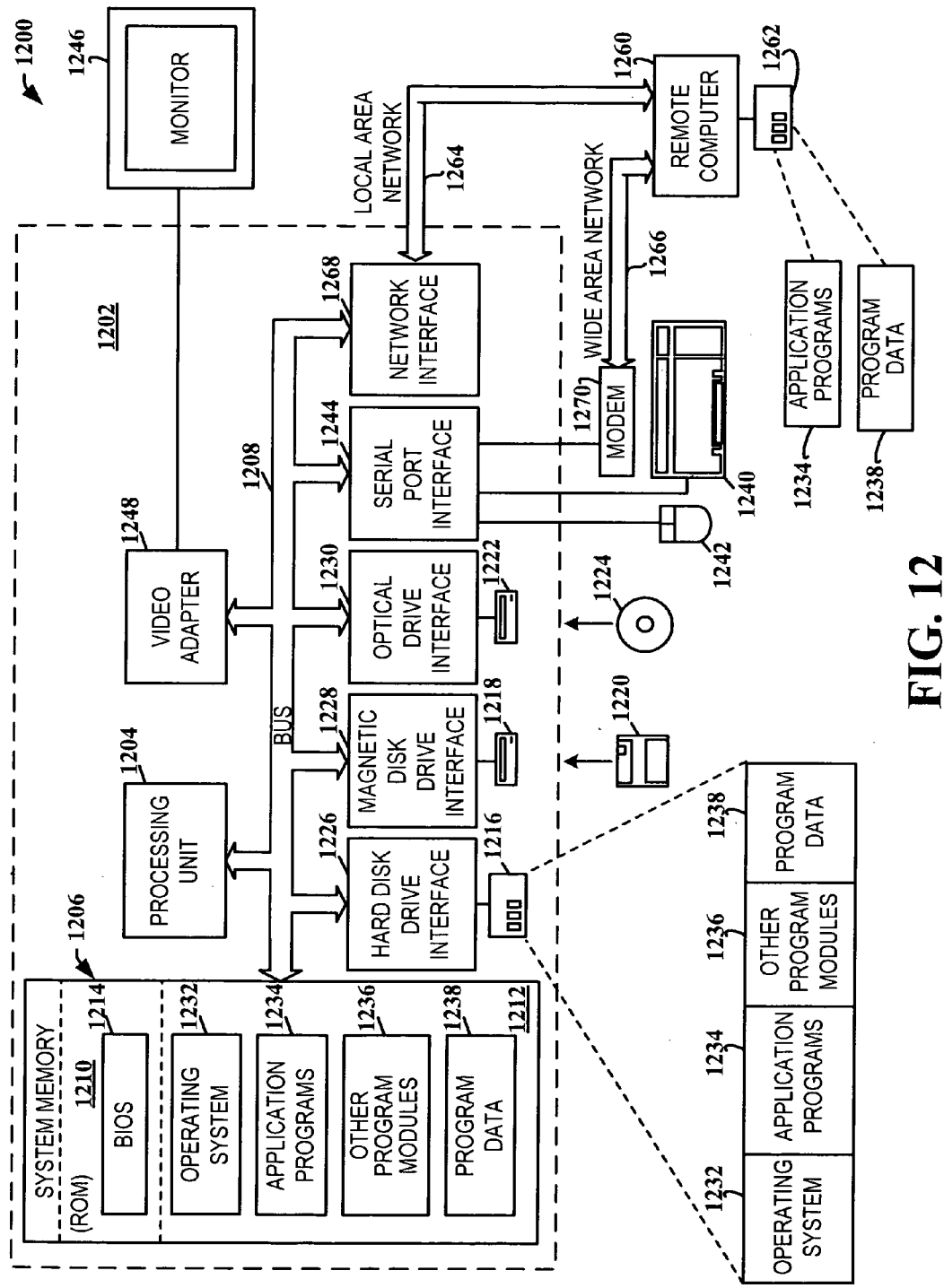
FIG. 12 illustrates an example operating environment in which an embodiment can function.

In order to provide additional context for implementing various aspects of the embodiments, FIG. 12 and the following discussion is intended to provide a brief, general description of a suitable computing environment 1200 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, handheld computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on standalone computers. In a distributed computing environment, program modules can be located in local and/or remote memory storage devices.

With reference to FIG. 12, an exemplary system environment 1200 for performing the various aspects of the embodiments include a conventional computer 1202, including a processing unit 1204, a system memory 1206, and a system bus 1208 that couples various system components, including the system memory, to the processing unit 1204. The processing unit 1204 can be any commercially available or proprietary processor. In addition, the processing unit can be implemented as multi-processor formed of more than one processor, such as can be connected in parallel.

The system bus 1208 can be any of several types of bus structure including a memory bus or memory controller, a peripheral bus, and a local bus using any of a variety of conventional bus architectures such as PCI, VESA, Microchannel, ISA, and EISA, to name a few. The system memory 1206 includes read only memory (ROM) 1210 and random access memory (RAM) 1212. A basic input/output system (BIOS) 1214, containing the basic routines that help to transfer information between elements within the computer 1202, such as during start-up, is stored in ROM 1210.

The computer 1202 also can include, for example, a hard disk drive 1216, a magnetic disk drive 1218, e.g., to read from or write to a removable disk 1220, and an optical disk drive 1222, e.g., for reading from or writing to a CD-ROM disk 1224 or other optical media. The hard disk drive 1216, magnetic disk drive 1218, and optical disk drive 1222 are connected to the system bus 1208 by a hard disk drive interface 1226, a magnetic disk drive interface 1228, and an optical drive interface 1230, respectively. The drives 1216-1222 and their associated computer-readable media provide nonvolatile storage of data, data structures, computer-executable instructions, etc. for the computer 1202. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1200, and further that any such media can contain computer-executable instructions for performing the methods of the embodiments.

A number of program modules can be stored in the drives 1216-1222 and RAM 1212, including an operating system 1232, one or more application programs 1234, other program modules 1236, and program data 1238. The operating system 1232 can be any suitable operating system or combination of operating systems. By way of example, the application programs 1234 and program modules 1236 can include an advertising keyword cross-selling scheme in accordance with an aspect of an embodiment.

A user can enter commands and information into the computer 1202 through one or more user input devices, such as a keyboard 1240 and a pointing device (e.g., a mouse 1242). Other input devices (not shown) can include a microphone, a joystick, a game pad, a satellite dish, a wireless remote, a scanner, or the like. These and other input devices are often connected to the processing unit 1204 through a serial port interface 1244 that is coupled to the system bus 1208, but can be connected by other interfaces, such as a parallel port, a game port or a universal serial bus (USB). A monitor 1246 or other type of display device is also connected to the system bus 1208 via an interface, such as a video adapter 1248. In addition to the monitor 1246, the computer 1202 can include other peripheral output devices (not shown), such as speakers, printers, etc.

It is to be appreciated that the computer 1202 can operate in a networked environment using logical connections to one or more remote computers 1260. The remote computer 1260 can be a workstation, a server computer, a router, a peer device or other common network node, and typically includes many or all of the elements described relative to the computer 1202, although for purposes of brevity, only a memory storage device 1262 is illustrated in FIG. 12. The logical connections depicted in FIG. 12 can include a local area network (LAN) 1264 and a wide area network (WAN) 1266. Such networking environments are commonplace in offices, enterprise-wide computer networks, intranets and the Internet.

When used in a LAN networking environment, for example, the computer 1202 is connected to the local network 1264 through a network interface or adapter 1268. When used in a WAN networking environment, the computer 1202 typically includes a modem (e.g., telephone, DSL, cable, etc.) 1270, or is connected to a communications server on the LAN, or has other means for establishing communications over the WAN 1266, such as the Internet. The modem 1270, which can be internal or external relative to the computer 1202, is connected to the system bus 1208 via the serial port interface 1244. In a networked environment, program modules (including application programs 1234) and/or program data 1238 can be stored in the remote memory storage device 1262. It will be appreciated that the network connections shown are exemplary and other means (e.g., wired or wireless) of establishing a communications link between the computers 1202 and 1260 can be used when carrying out an aspect of an embodiment.

In accordance with the practices of persons skilled in the art of computer programming, the embodiments have been described with reference to acts and symbolic representations of operations that are performed by a computer, such as the computer 1202 or remote computer 1260, unless otherwise indicated. Such acts and operations are sometimes referred to as being computer-executed. It will be appreciated that the acts and symbolically represented operations include the manipulation by the processing unit 1204 of electrical signals representing data bits which causes a resulting transformation or reduction of the electrical signal representation, and the maintenance of data bits at memory locations in the memory system (including the system memory 1206, hard drive 1216, floppy disks 1220, CD-ROM 1224, and remote memory 1262) to thereby reconfigure or otherwise alter the computer system's operation, as well as other processing of signals. The memory locations where such data bits are maintained are physical locations that have particular electrical, magnetic, or optical properties corresponding to the data bits.

Figure 13:
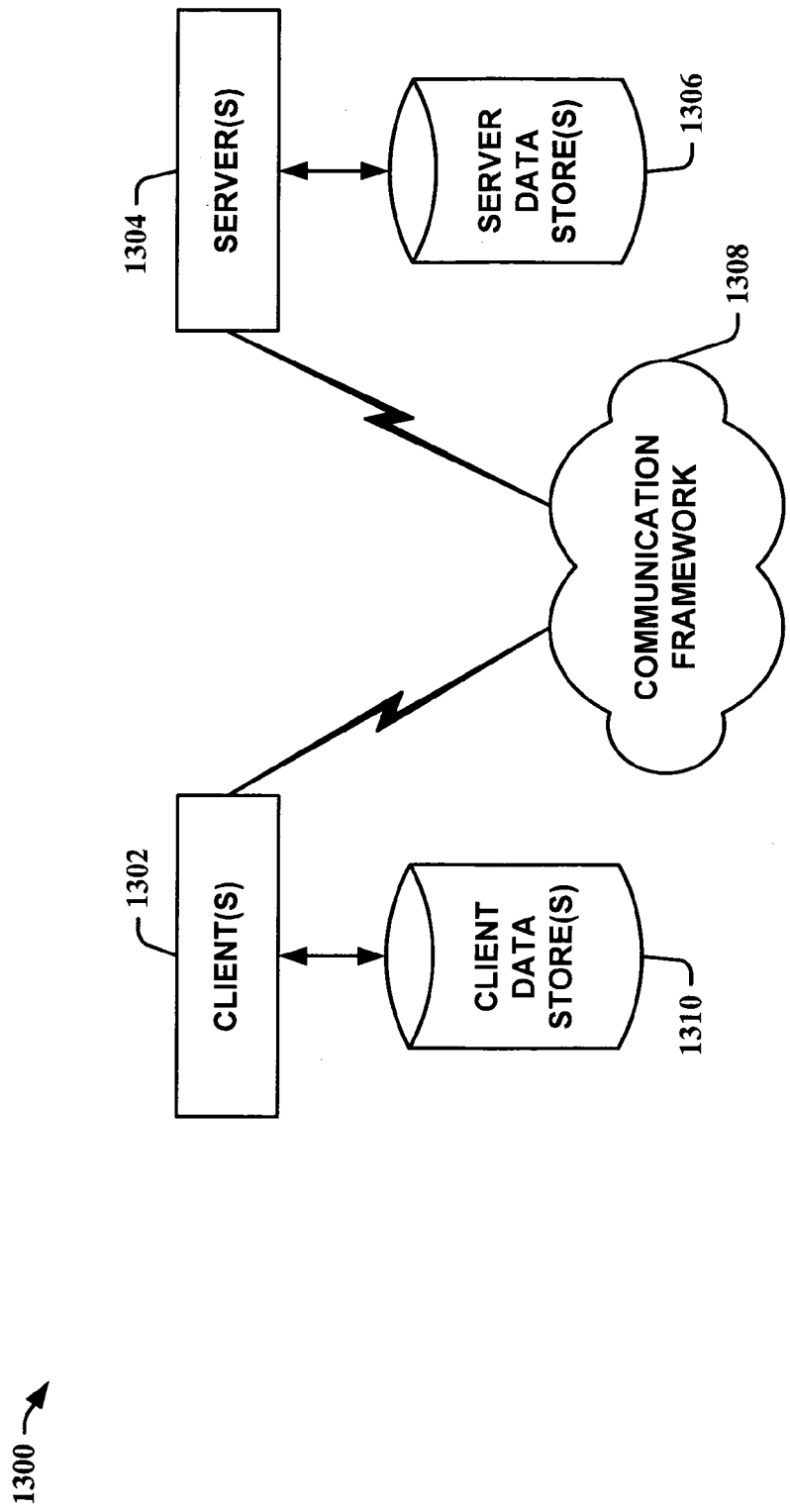
FIG. 13 illustrates another example operating environment in which an embodiment can function.

FIG. 13 is another block diagram of a sample computing environment 1300 with which embodiments can interact. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). One possible communication between a client 1302 and a server 1304 can be in the form of a data packet adapted to be transmitted between two or more computer processes. The system 1300 includes a communication framework 1308 that can be employed to facilitate communications between the client(s) 1302 and the server(s) 1304. The client(s) 1302 are connected to one or more client data store(s) 1310 that can be employed to store information local to the client(s) 1302. Similarly, the server(s) 1304 are connected to one or more server data store(s) 1306 that can be employed to store information local to the server(s) 1304.

It is to be appreciated that the systems and/or methods of the embodiments can be utilized in advertising keyword cross-selling facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system, including one or more computer storage media having computer-executable components stored thereon, that facilitates advertising keyword cross-selling, the computer-executable components comprising:

a receiving component that receives search keywords from a keyword data source;

a keyword determination component that:

selects, as seed keywords, a subset of the received search keywords and expands the seed keywords to determine other keywords relevant to the seed keywords, the seed keywords being selected based on at least one of commercial value, frequency of use, and a number of times the seed keywords have previously been bid on by advertisers;

a cross-sell pair determination component that pairs the expanded keywords with relevant advertisers to facilitate in cross-selling the expanded keywords to the relevant advertisers; and a proactive cross-sell component that actively promotes the expanded keywords to the relevant advertisers by automatically contacting the relevant advertisers with suggestions of suitable keywords selected from the expanded keywords via an electronic medium.

2. The system of claim 1, wherein the keyword data source comprises a search query log.

3. The system of claim 1,
wherein the keyword determination component employs a funnel search process that analyzes similar interest between the seed keywords and the other keywords to facilitate in determining the expanded keywords,
wherein the funnel search process includes the step of forming search funnels that represent transitions utilized by a plurality of searchers from a first search keyword to at least one additional search keyword,
and wherein the size of each search funnel is determined by a number of the plurality of searchers that search with both the first search keyword and the at least one additional search keyword.

4. The system of claim 1, further comprising:
a cross-linking component that indexes the expanded keywords to the relevant advertisers to facilitate in the construction of cross-sell pairs.

5. The system of claim 1 further comprising:
a cross-selling filter component that filters inappropriate cross-sell pairs based on attitude and/or cause-effect relationships.

6. The system of claim 5, wherein the cross-selling filter component employs a machine learning classifier to facilitate in filtering the inappropriate cross-sell pairs.

7. An online advertising auction process that employs the system of claim 1.

8. An online advertising keyword service that employs the system of claim 1 to provide potential advertising keywords to a user.

9. One or more computer storage media having computer-useable instructions embodied thereon for performing a method for facilitating advertising keyword cross-selling, the method comprising:
obtaining search keywords from a keyword data source;
determining a commercial value for at least a portion of the search keywords;
selecting as seed keywords a subset of the obtained search keywords that have commercial value over a designated threshold;
after selecting the seed keywords, expanding the seed keywords through one of search funnel expansion or search result extraction to determine sequentially and/or conceptually related keywords, wherein search result extraction comprises searching for the seed keywords in a search engine, obtaining the top web page titles and content resulting from the searching, and merging the top web page titles and content;
automatically discovering potentially commercially valuable keywords from the sequentially and/or conceptually related keywords;
constructing a keyword-to-advertiser inverse index table associating the potentially commercially valuable sequentially and/or conceptually related keywords identified after expanding the seed keywords with advertisers relevant to the keywords;
retrieving a list of the relevant advertisers by querying the keyword-to-advertiser inverse index table with the potentially commercially valuable sequentially and/or conceptually related keywords identified after expanding the seed keywords;
assigning a score to advertiser/keyword pairs retrieved from the querying;
determining a top N most relevant advertisers, wherein N is an integer from one to infinity;
filtering inappropriate cross-selling by analyzing attitude and/or cause-effect relationships; and
proactively cross-selling the potentially commercially valuable keywords to the relevant advertisers by automatically informing the relevant advertisers with the potentially commercially valuable keywords.

10. The media of claim 9, wherein the keyword data source comprises a search query log.

11. The media of claim 9, wherein the method further comprises:
discovering the relevant advertisers based on the potential commercially valuable keywords via a global network.

12. One or more computer storage media having computer-useable instructions embodied thereon for performing a method that facilitates keyword expansion for relevant advertisers, the method comprising:
obtaining search keywords from a keyword data source;
selecting as seed keywords a subset of the obtained search keywords that have commercial value, are frequently used, and/or have been bid on by advertisers less than a specified number of times;
obtaining search page views generated for the seed keywords from a search data source;
determining a session to which the search page views belong;
extracting other search keywords from each of one or more sessions in order and forming search funnels;
counting a number of searchers for each other search keyword to determine sizes of the search funnels;
identifying relevant advertisers for the other search keywords; and
automatically suggesting one or more of the other search keywords to the relevant advertisers.

13. The media of claim 12, wherein the method further comprises:
consolidating the search funnels utilizing funnel clustering, noise filtering, and/or keyword-type categorization.

14. A device employing the system of claim 1 comprising at least one selected from the group consisting of a computer, a server, or a handheld electronic device.

15. The system of claim 1, wherein the keyword data source comprises an advertisement data source.

16. The system of claim 1, wherein the automatic contacting of the advertisers with suggestions of suitable keywords is unsolicited.

17. The system of claim 1, wherein automatically contacting the advertisers with suggestions of suitable keywords is performed by providing the suggestions of suitable keywords in billing statements sent to the advertisers.

18. The media of claim 9, wherein the keyword data source comprises an advertisement data source.

* * * * *